(12) United States Patent
Kleinsasser

(10) Patent No.: US 6,923,142 B2
(45) Date of Patent: Aug. 2, 2005

(54) ANIMAL FEEDER WITH ADJUSTMENT OF A FEED DISCHARGE OPENING

(75) Inventor: Jonathan Kleinsasser, Ste. Agathe (CA)

(73) Assignee: Crystal Spring Colony Farms Ltd., Ste. Agate (CA)

( * ) Notice: Subject to any disclaimer, the term of this patent is extended or adjusted under 35 U.S.C. 154(b) by 0 days.

(21) Appl. No.: 10/729,368

(22) Filed: Dec. 8, 2003

(65) Prior Publication Data

US 2005/0132967 A1 Jun. 23, 2005

(51) Int. Cl.[7] .............................................. A01K 1/10
(52) U.S. Cl. ...................................................... 119/53
(58) Field of Search .......................... 119/53, 53.5, 54, 119/57, 52.1; 222/547, 564, 509

(56) References Cited

U.S. PATENT DOCUMENTS

| | | | |
|---|---|---|---|
| 1,244,474 A * | 10/1917 | Cowles ....................... 312/278 |
| 1,719,245 A | 7/1929 | Smidley | |
| 1,746,558 A * | 2/1930 | Rowe .......................... 119/54 |
| 1,919,587 A * | 7/1933 | Einsel et al. ................... 119/53 |
| 2,701,548 A * | 2/1955 | Wolfe ......................... 119/51.5 |
| 3,066,649 A * | 12/1962 | Geerlings ................... 119/53.5 |
| 3,552,360 A | 1/1971 | Nelson | |
| 4,242,985 A | 1/1981 | Freeborn | |
| 4,278,049 A | 7/1981 | Van Dusseldorp | |
| 4,316,484 A * | 2/1982 | De Frees ..................... 137/389 |
| 4,351,274 A | 9/1982 | Pannier | |
| 4,380,214 A * | 4/1983 | Williams ................... 119/57.2 |
| 4,462,338 A | 7/1984 | Thibault | |
| 4,475,726 A * | 10/1984 | Smith .......................... 269/41 |
| 4,660,508 A | 4/1987 | Kleinsasser et al. | |
| 5,058,532 A * | 10/1991 | Lamb ......................... 119/752 |
| 5,351,649 A * | 10/1994 | Rovira Badia et al. ..... 119/53.5 |
| 5,578,032 A * | 11/1996 | Lalonde ....................... 606/54 |
| 5,603,285 A | 2/1997 | Kleinsasser | |
| 6,065,374 A * | 5/2000 | Taggart ...................... 81/63.2 |
| 6,408,787 B1 | 6/2002 | Clark | |
| 6,637,368 B2 | 10/2003 | Bondarenko et al. | |

* cited by examiner

Primary Examiner—Teri Pham Luu
Assistant Examiner—Jordan Lofdahl
(74) Attorney, Agent, or Firm—Adrian D. Battison; Michael R. Williams; Ryan W. Dupuis

(57) ABSTRACT

An animal feeder includes a hopper above a shelf onto which feed can fall to be taken by the animal or dropped into a trough below the shelf. The height of the shelf is adjustable to change the width of the opening through which the feed passes to control feed rate. The shelf is carried on straps which extend along the end walls of the hopper and are movable by an adjustment linkage defined by a plate carried on the end wall and a manually adjustable lever mounted for pivotal movement on the plate. The plate has an arcuate outer edge which is serrated to define an arcuate row of saw teeth and the lever is formed by a flat of sheet material which lies in a plane parallel to and slides over the plate and includes a portion thereof which is bent out of a plane of the lever into the plane of the plate which is also serrated with a row of saw teeth shaped to mesh with the saw teeth of the arcuate portion. The portion of the lever is movable in a direction away from the plate a non-meshing position in which the lever is free to move around the pivot axis.

20 Claims, 4 Drawing Sheets

ANIMAL FEEDER WITH ADJUSTMENT OF A FEED DISCHARGE OPENING

This invention relates to an animal feeder with an adjustable feed discharge opening thus adjusting the amount of feed which is allowed to pass through the opening.

BACKGROUND OF THE INVENTION

Various arrangements of animal feeder are provided in which there is a trough into which feed can be deposited from a hopper above the trough. In most cases the feed material to be deposited can vary in particle size and viscosity so that it is often desirable to provide an arrangement which allows an adjustment of the opening through which the material can feed from the hopper into the trough.

In many cases the opening is provided by a simple shutter at the gap between the Hopper and the trough where the height of the shutter can be adjusted to vary the gap at the bottom of the shutter.

In U.S. Pat. No. 4,660,508 (Kleinsasser) issued Apr. 28$^{th}$, 1987 is disclosed a feeder which provides a shelf above the trough with the hopper discharging onto the shelf in a manner so that the feed remains on the shelf but can be moved from the shelf to the trough by the animal as required. Feeders of this type have achieved significant commercial success. Adjustment of the height of the shelf is necessary for the purpose of accommodating different types of feed and different feed rates and this is obtained by a hand crank screw which operates with a threaded nut to raise and lower a strap carrying the shelf. The screw is used in adjustment of this device because the deposit of the feed onto the self requires an accurate adjustment of the distance between the shelf and the bottom edge of the hopper so that cruder systems with a less fine adjustment have been rejected.

U.S. Pat. No. 5,603,285 also of Kleinsasser issued Feb. 18$^{th}$, 1997 discloses a further similar device where additional adjustment of the height of the shelf is possible but again fine adjustment is provided by a screw.

In a number of US patents it is known to provide relatively crude adjustment techniques. For example the following patents provide adjustment devices; U.S. Pat. No. 1,719,245 (Smidley) issued Jul. 2$^{nd}$, 1929, U.S. Pat. No. 3,552,360 (Nelson) issued Jan. 5$^{th}$, 1971, U.S. Pat. No. 4,242,985 (Freeborn) issued Jan. 6$^{th}$, 1981, U.S. Pat. No. 4,278,049 (Van Dusseldorp) issued Jul. 14$^{th}$, 1981, U.S. Pat. No. 4,351,274 (Pannier) issued Sep. 28$^{th}$, 1982, U.S. Pat. No. 4,462,338 (Thibault) issued Jul. 31$^{st}$, 1984, U.S. Pat. No. 6,408,787 (Clark) issued Jun. 25$^{th}$, 2002.

It is also known to provide arrangements in which adjustment in a relatively crude manner is effected by selecting one of a plurality of holes in which to locate the pin of an adjustment lever so that the adjustment is effected step by step. As the holes must be necessarily a certain distance apart, such an adjustment provides a relatively crude distance of adjustment so that the fine tuning necessary for determining the specific dimensions of an opening to accurately control the rate of flow of feed material is not possible in such a system. One example is shown in U.S. Pat. No. 6,637,368 (Bondarenko) issued Oct. 28$^{th}$, 2003. This provides a link which extends along one end wall of a feeder and a lever can be moved to place a pin into a selected one of a number of holes in the end wall.

SUMMARY OF THE INVENTION

It is one object of the invention to provide an improved feeder which allows fine adjustment of the opening to allow a measured amount of feed while allowing quick return of the opening to a set position.

According to one aspect of the invention there is provided an animal feeder comprising:
  a hopper for containing a feed material to be dispensed to an animal for feeding therefrom;
  a receptacle for receiving the feed from the hopper from which the animal can take the feed;
  an opening through which the feed passes so that the amount of feed discharged from the hopper to the receptacle is controlled by a width of the opening;
  and an adjustment linkage for operating adjustment movement of the opening, the linkage including:
  a manually adjustable lever mounted for pivotal movement about a pivot axis;
  a link attached to the lever and to an element of the opening such that pivotal movement of the lever causes longitudinal movement of the link to effect adjustment of the opening;
  a plate defining a surface over which the lever moves, the surface defining an arcuate portion lying on a n arc of a circle surrounding the pivot axis of the lever;
  the arcuate portion of the surface being serrated to define an arcuate row of saw teeth;
  the lever having a lever edge which is also serrated with a row of saw teeth shaped to mesh with the saw teeth of the arcuate portion;
  the lever being movable from a meshing position to a non-meshing position in which the lever is free to move around the pivot axis to move the lever and the teeth thereof along the arcuate row of saw teeth to adjust the position of the link.

Preferably the plate lies in a radial plane of the pivot axis and the arcuate row of teeth are located on an edge of the plate.

Preferably the edge of the plate is an outer edge facing radially outwardly of the axis.

Preferably the lever is formed by a flat of sheet material which lies in a plane parallel to and slides over the plate and wherein the lever includes a portion thereof which is bent out of a plane of the lever into the plane of the plate and carries the row of saw teeth of the lever on an edge thereof.

Preferably the lever is movable in a direction axial of the pivot axis to move the row of teeth thereof axially away from the plate.

Preferably the row of teeth on the lever face radially inwardly toward the pivot axis.

Preferably the lever has a hole therein exposing a portion of the plate and markings thereon adjacent the row of saw teeth thereon.

Preferably the lever is pivotally mounted on the plate.

Preferably the link is connected to the lever by a pin which is slidable in a slot in the plate.

Preferably the pin carries a spring which biases the lever into engagement with the plate into said meshing position and which is compressible to allow movement of the lever to the non-meshing position.

Preferably the plate is mounted on an end wall of the hopper parallel to and spaced from the end wall.

Preferably the link comprises a strap located between the plate and the end wall.

In one preferred arrangement there is provided a trough into which the feed can fall and wherein the receptacle comprises a shelf mounted above the trough arranged so that the animal can take feed from the shelf or can move the feed from the shelf to the trough. This construction is well known as a "wet/dry" feeder where the shelf holds the feed in dry condition above the trough but can be added to water in the trough for a wet condition. In this arrangement, the link is connected to the shelf for adjustment of the height thereof relative to a bottom edge of the hopper defining the opening therebetween.

However the same construction can be used with a conventional dry feeder where the adjustment is effected by moving a plate which extends generally upright from a base wall of the trough so that a bottom edge of the plate cooperates with the base wall in defining the opening. Typical dry feeders are commonly, but not necessarily, double sided so that the same hopper feeds two sides of a trough with each side having its own adjustment plate. In this case there my be two such adjustment devices as defined above at each end of the hopper so that each plate is independently adjusted by a pair of adjustment devices one at each end wall of the hopper. Alternatively the two plates may be adjusted commonly by a single pair of adjustment devices depending upon the requirements of the customer.

According to a second aspect of the invention there is provided an animal feeder comprising:
- a hopper for containing a feed material to be dispensed to an animal for feeding therefrom;
- a trough into which the feed can fall;
- a shelf mounted above the trough arranged so that the animal can take feed from the shelf or can move the feed from the shelf to the trough;
- the shelf being mounted so as to define an opening relative to a bottom edge of the hopper through which the feed passes;
- the height of the shelf being adjustable relative to the bottom edge of the hopper to adjust the opening so that the amount of feed discharged from the hopper to the receptacle is controlled by a width of the opening;
- and an adjustment linkage for operating adjustment movement of the shelf, the linkage including:
- a manually adjustable lever mounted for pivotal movement about a pivot axis;
- a link attached to the lever and to the shelf such that pivotal movement of the lever causes longitudinal movement of the link to effect adjustment of the height of the shelf;
- a plate defining a surface over which the lever moves, the surface defining an arcuate portion lying on a n arc of a circle surrounding the pivot axis of the lever;
- the arcuate portion of the surface being serrated to define an arcuate row of saw teeth;
- the lever having a lever edge which is also serrated with a row of saw teeth shaped to mesh with the saw teeth of the arcuate portion;
- the lever being movable from a meshing position to a non-meshing position in which the lever is free to move around the pivot axis to move the lever and the teeth thereof along the arcuate row of saw teeth to adjust the position of the link.

According to a third aspect of the invention there is provided an animal feeder comprising:
- a hopper for containing a feed material to be dispensed to an animal for feeding therefrom;
- a receptacle for receiving the feed from the hopper from which the animal can take the feed;
- an opening through which the feed passes so that the amount of feed discharged from the hopper to the receptacle is controlled by a width of the opening;
- and an adjustment linkage for operating adjustment movement of the opening, the linkage including:
- a manually adjustable lever mounted for pivotal movement about a pivot axis;
- a link attached to the lever and to an element of the opening such that pivotal movement of the lever causes longitudinal movement of the link to effect adjustment of the opening;
- a plate mounted on an end wall of the hopper parallel thereto and spaced therefrom and defining a surface over which the lever moves, the plate defining an arcuate edge lying on an arc of a circle surrounding the pivot axis of the lever and facing outwardly of the axis;
- the arcuate edge of the surface being serrated to define an arcuate row of saw teeth;
- the lever being formed by a flat of sheet material which lies in a plane parallel to and slides over the plate;
- the lever including a portion thereof which is bent out of a plane of the lever into the plane of the plate;
- the portion of the lever having a lever edge facing radially inwardly toward the axis which is also serrated with a row of saw teeth shaped to mesh with the saw teeth of the arcuate portion;
- the portion of the lever being movable in a direction axially of the axis away from the plate from a meshing position to a non-meshing position in which the lever is free to move around the pivot axis to move the lever and the teeth thereof along the arcuate row of saw teeth to adjust the position of the link.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
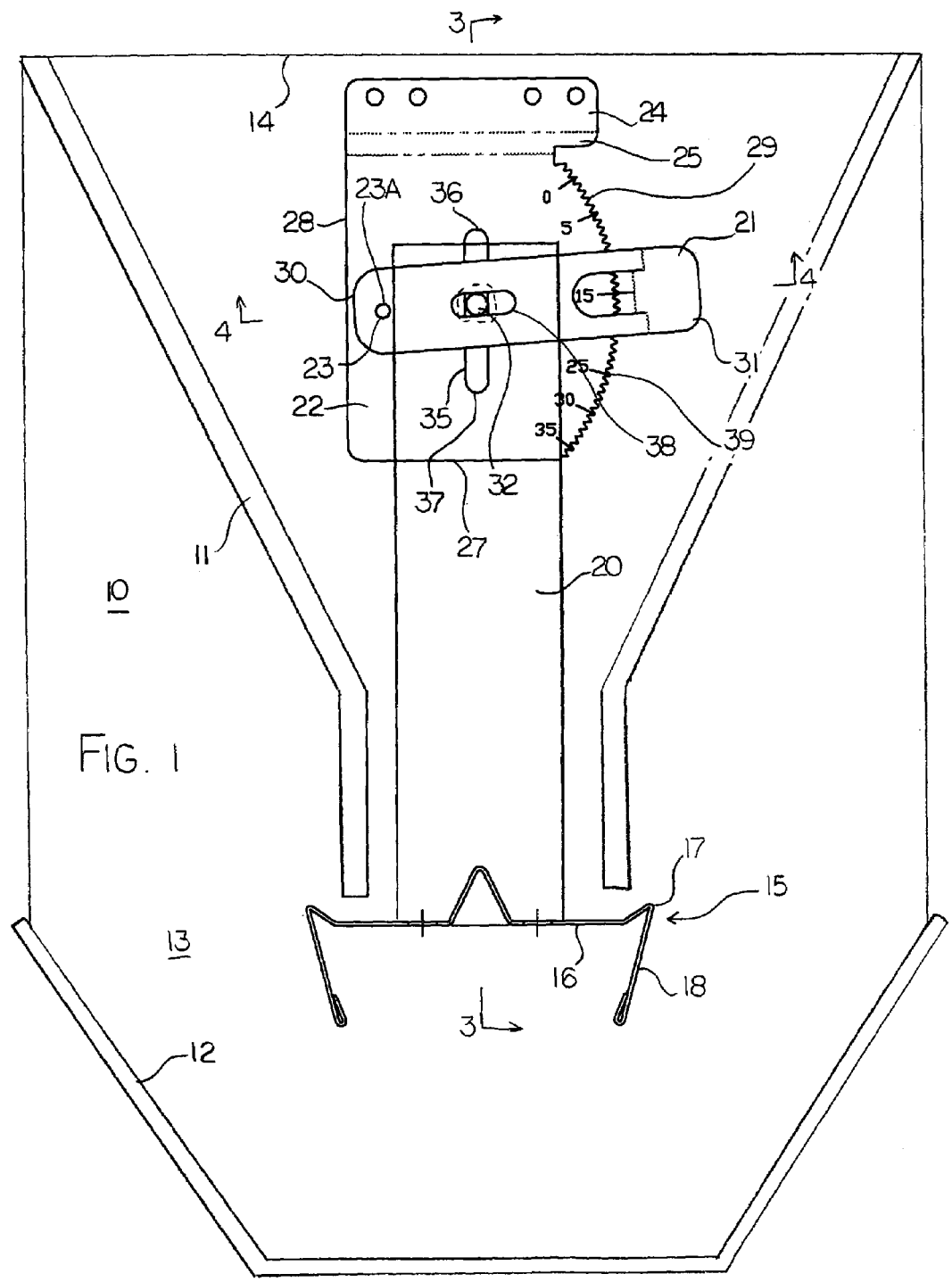
FIG. 1 is a cross sectional view through a feeder according to the present invention.

A feeder is generally indicated at 10 and includes a hopper 11 and a trough 12. The trough is connect to the hopper by end walls 13 so as to form an integral structure with generally open top 14 through which feed can be inserted for containing in the hopper and for discharge into the trough 12 for feeding by one or more animals. In the embodiment shown there is provided a shelf 15 with a generally horizontal surface 16, an upturned edge 17 and a downwardly turned lip 18 all of which are substantially as described in the above patents of Kleinsasser. Further details of the structure therefore can be obtained by reference to the above patents so that no further detailed description is necessary herein. A water supply into the trough can be provided under control operation or operation by the animal as is known in the above patents.

The shape and arrangement of the hopper and trough can be varied and can provide either a two sided structure as shown or a single sided structure.

Figure 3:
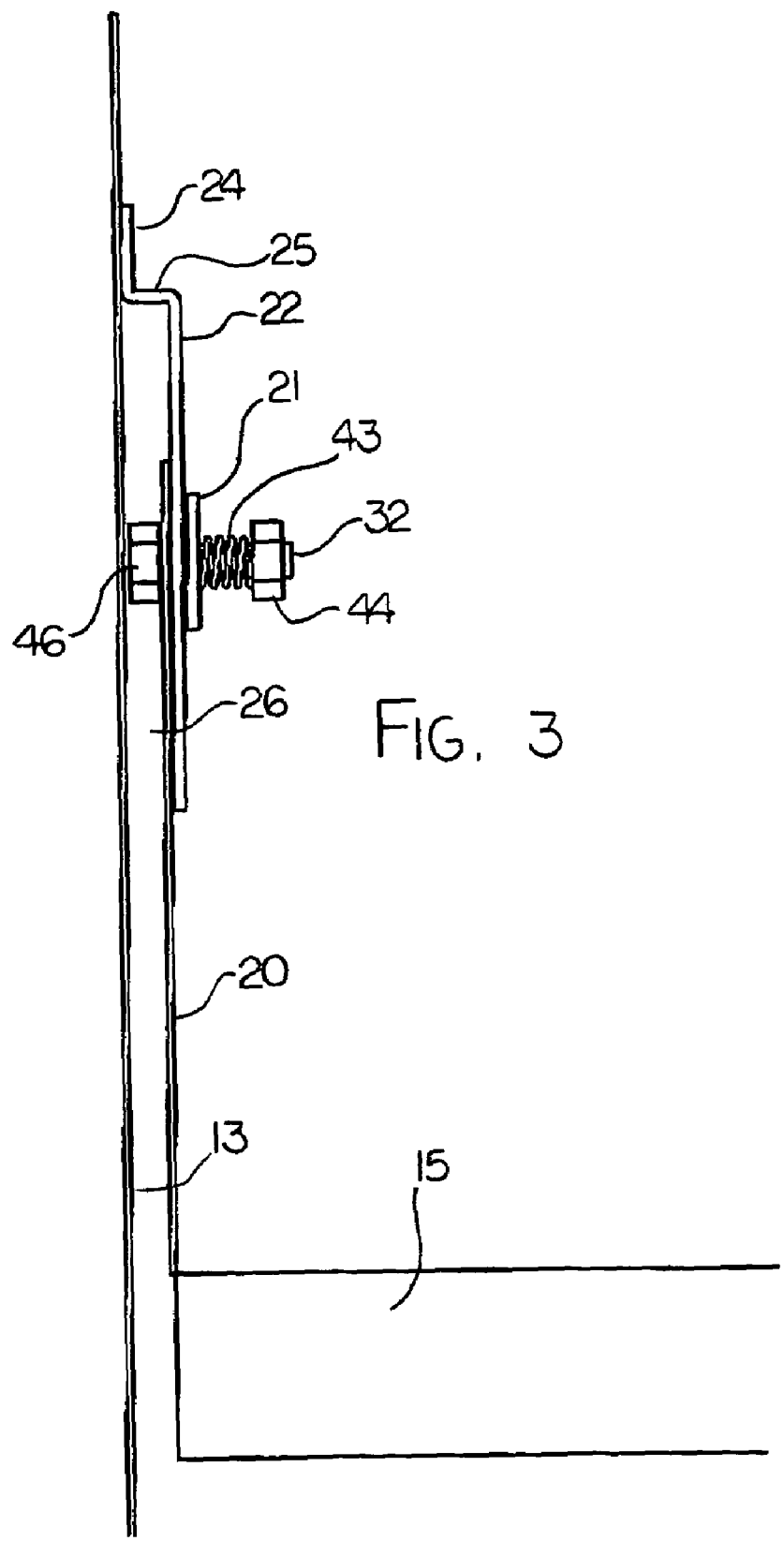
FIG. 3 is a cross sectional view along the lines 3—3 of FIG. 1.
Figure 4:
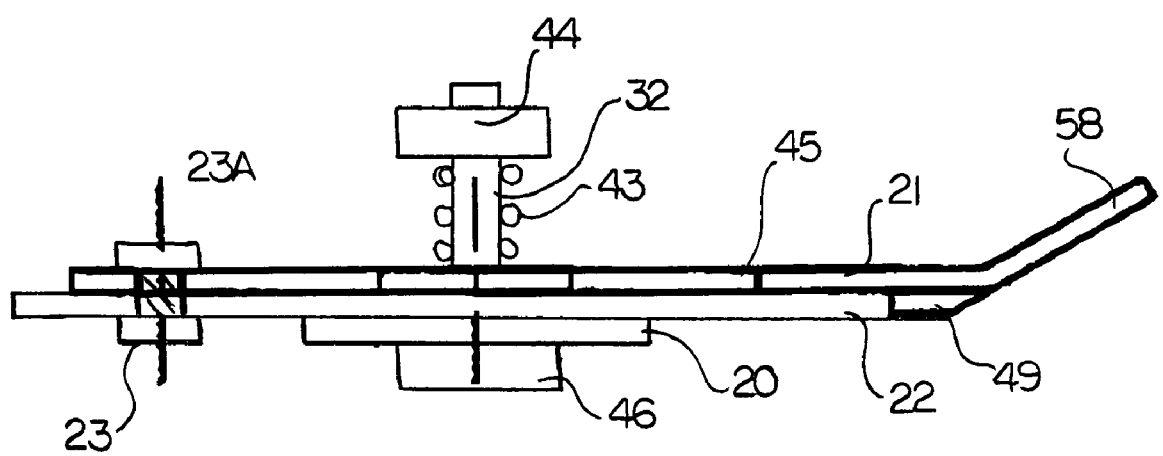
FIG. 4 is a cross sectional view along the lines 4—4 of FIG. 1.

The height of the shelf relative to the end wall of the hopper is adjusted by raising straps 20 where each strap is arranged at a respective end of the shelf and lies along the end wall 13 parallel to the end wall as shown in FIG. 3. The strap is raised and lowered by a lever 21 mounted on a support plate 22 by a pivot pin 23. The support plate 22 as best shown in FIG. 3 includes an upper mounting flange 24 which is attached to the end wall 13. A bend portion 25 is arranged at right angles to the flange portion 24 and therefore supports the plate 22 at a spaced position from the wall 13 leaving a space 26 at the rear of the plate 22 and inside the end wall 13. The plate 22 is formed from sheet metal which is bent and cut to form the required shape as defined above so that the plate is suspended along the end wall with a bottom edge 27 and at two side edges 28 and 29. The pivot pin 23 is arranged adjacent the side edge 28 and approximately at a mid height of the plate. The lever 21 is also formed of sheet metal which is stamped and punched to form a generally elongate member with an end 30 at the pivot pin 23 and a second end 31 extended beyond the edge 29 of the plate. The lever is formed of flat sheet metal similar to that of the plate so that it lies in contact with the front face of the plate. The lever 21 is attached to the strap 20 by a pin 32 which passes through a hole in the lever and a hole in the strap. A slot 35 is provided in the plate 22 which guides movement of the pin 32 so that the pin is constrained to move vertically and thus move the strap 20 vertically. The length of the slot 35 between an upper end 36 and a lower end 37 provides a length of adjustment equal the allowable movement of the lever 21. A slot 38 in the lever allows the pin to move in the vertical direction while accommodating the arcuate movement of the lever.

The edge 29 of the plate 22 faces away from the pivot axis 23A of the pivot pin 23 and is cut to form a series of saw teeth 39 along the edge 29 from an upper edge 40 to a lower edge 41. Thus the edge of the plate 29 forms an arcuate edge around the axis 23A with the saw teeth punched in the edge of the plate and facing away from the plate as a serrated edge.

Figure 2:
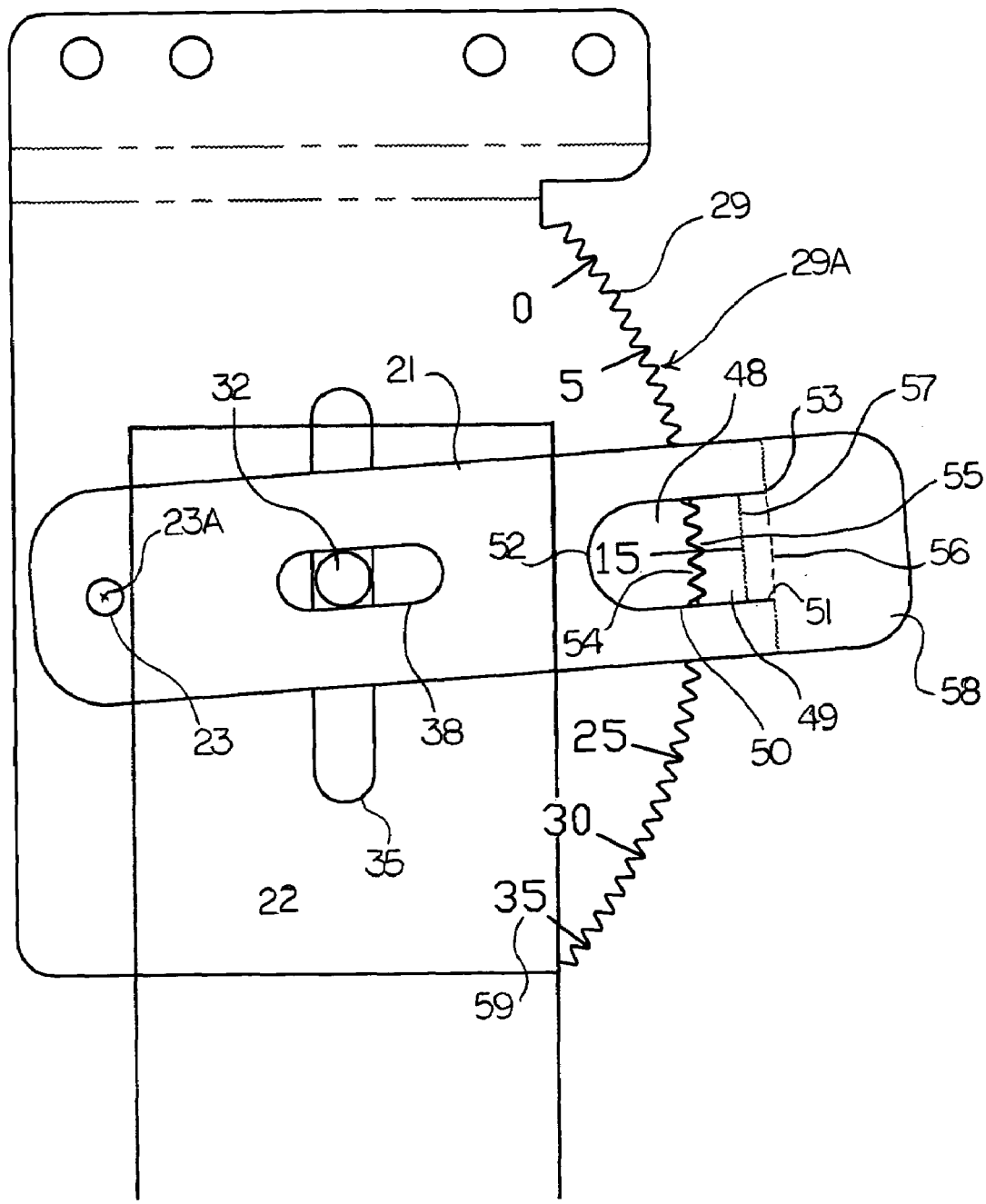
FIG. 2 is a view on an enlarged scale of the adjustment mechanism of FIG. 1.

The lever 21 is held flat against the surface of the plate 22 by a spring 43 on the pin 32. The spring is held in place by a nut 44 on the pin 32 so that the spring is compressed between the nut and the outer face 45 of the lever 21. The pin 32 has a head 46 behind the strap 20. The pivot pin 23 provides enough flexibility to allow the lever 21 to be moved away from the plate 22 compressing the spring 43 against the bias of the spring 43. The lever 21 has a hole 48 formed in the lever. The lever further has a recessed portion 49 which is bent downwardly from the plane of the lever into the plane of the plate 22. The hole and the recessed portion are formed by cutting through the plate along a line 50 which extends from an edge 51 along the lever to a semi-circular portion 52 and back along the lever to a second edge 53. This slit or cut in the sheet metal forming the lever allows a serrated edge 54 to be formed having teeth 55 at an edge of the hole 48 and forming an edge of the recessed portion 49. Thus the recessed portion is bent downwardly at a line 56 and is then bent to lie in the common plane with the plate 22 at a line 57. The material beyond the teeth 55 and within the hole 48 is then removed leaving the hole 48 and leaving the exposed teeth 55 at the inwardly facing edge of the recess portion 49. Thus as best shown in FIG. 2, the lever is in its normal position flat against the surface of the plate 62 thus causing the saw teeth of the edge of the lever to be in meshing engagement with the saw teeth of the arcuate edge of the plate. The width of the saw teeth is equal on both surfaces so that the teeth are directly meshing. The number of teeth on the edge of the lever is very much less than the number of teeth on the arcuate edge of the plate since the lever is intended to move around the arcuate edge of the plate in an adjustment movement. However the amount of adjustment is equal the pitch of the saw teeth.

The lever 21 includes an end piece 58 which is bent in a direction away from the plate 22 so as to provide a handle or tab which can be readily grasped since it is sufficiently spaced from the end wall of the feeder to be readily accessible by the hand of the user.

Markings 59 are provided on the plate counting the number of saw teeth and numbered from zero at one end through to the total number at the other end of the arcuate edge of the plate. The hole 48 allows viewing of the markings through the hole onto the front surface of the plate so that the user can line up a centre line of the hole with a selected one of the markings.

In operation the meshing saw teeth arrangement of the lever and the plate allow a fine adjustment, bearing in mind that the saw teeth have a relatively fine pitch and bearing in mind that the distance of the pin 32 from the pivot access 23A is significantly less than the distance of the saw teeth from the pivot axis. Thus movement of one pitch of one saw tooth can be arranged to provide a movement of the shelf of a distance of the order of $\frac{1}{32}$ to $\frac{1}{16}$ inch.

However when required, the shelf can be moved rapidly down to a lowered position simply by grasping the lever and dropping it downwardly to the bottom end of the adjustment thus rapidly increasing the spacing between the bottom of the hopper and the shelf for cleaning or other operations where the distance needs to be rapidly opened. However when rapidly opened, the shelf can be rapidly returned back to its set position simply by the user recalling the number to which it was originally set and by adjusting it rapidly back to the selected number marked on the arcuate edge of the plate 22.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. An animal feeder comprising:
    a hopper for containing a feed material to be dispensed to an animal for feeding therefrom;
    a receptacle for receiving the feed from the hopper from which the animal can take the feed;
    an opening through which the feed passes so that the amount of feed discharged from the hopper to the receptacle is controlled by a width of the opening;
    and an adjustment linkage for operating adjustment movement of the opening, the linkage including:
        a manually adjustable lever mounted for pivotal movement about a pivot axis;
        a link attached to the lever and to an element of the opening such that pivotal movement of the lever causes longitudinal movement of the link to effect adjustment of the opening;
        a plate defining a surface over which the lever moves, the surface defining an arcuate portion lying on a n arc of a circle surrounding the pivot axis of the lever;
        the arcuate portion of the surface being serrated to define an arcuate row of saw teeth;

the lever having a lever edge which is also serrated with a row of saw teeth shaped to mesh with the saw teeth of the arcuate portion;

the lever being movable from a meshing position to a non-meshing position in which the lever is free to move around the pivot axis to move the lever and the teeth thereof along the arcuate row of saw teeth to adjust the position of the link.

2. The feeder according to claim 1 wherein the plate lies in a radial plane of the pivot axis and the arcuate row of teeth are located on an edge of the plate.

3. The feeder according to claim 2 wherein the edge of the plate is an outer edge facing radially outwardly of the axis.

4. The feeder according to claim 2 wherein the lever is formed by a flat of sheet material which lies in a plane parallel to and slides over the plate and wherein the lever includes a portion thereof which is bent out of a plane of the lever into the plane of the plate and carries the row of saw teeth of the lever on an edge thereof.

5. The feeder according to claim 4 wherein the lever is movable in a direction axial of the pivot axis to move the row of teeth thereof axially away from the plate.

6. The feeder according to claim 4 wherein the row of teeth on the lever face radially inwardly toward the pivot axis.

7. The feeder according to claim 4 wherein the lever has a hole therein exposing a portion of the plate and markings thereon adjacent the row of saw teeth thereon.

8. The feeder according to claim 1 wherein the lever is pivotally mounted on the plate.

9. The feeder according to claim 1 wherein the link is connected to the lever by a pin which is slidable in a slot in the plate.

10. The feeder according to claim 9 wherein the pin carries a spring which biases the lever into engagement with the plate into said meshing position and which is compressible to allow movement of the lever to the non-meshing position.

11. The feeder according to claim 1 wherein the plate is mounted on an end wall of the hopper parallel to and spaced from the end wall.

12. The feeder according to claim 11 wherein the link comprises a strap located between the plate and the end wall.

13. The feeder according to claim 1 wherein there is provided a trough into which the feed can fall and wherein the receptacle comprises a shelf mounted above the trough arranged so that the animal can take feed from the shelf or can move the feed from the shelf to the trough.

14. The feeder according to claim 13 wherein the link is connected to the shelf for adjustment of the height thereof relative to a bottom edge of the hopper defining the opening therebetween.

15. An animal feeder comprising:
a hopper for containing a feed material to be dispensed to an animal for feeding therefrom;
a trough into which the feed can fall;
a shelf mounted above the trough arranged so that the animal can take feed from the shelf or can move the feed from the shelf to the trough;
the shelf being mounted so as to define an opening relative to a bottom edge of the hopper through which the feed passes;
the height of the shelf being adjustable relative to the bottom edge of the hopper to adjust the opening so that the amount of feed discharged from the hopper to the receptacle is controlled by a width of the opening;

and an adjustment linkage for operating adjustment movement of the shelf, the linkage including:
a manually adjustable lever mounted for pivotal movement about a pivot axis;
a link attached to the lever and to the shelf such that pivotal movement of the lever causes longitudinal movement of the link to effect adjustment of the height of the shelf;
a plate defining a surface over which the lever moves, the surface defining an arcuate portion lying on a n arc of a circle surrounding the pivot axis of the lever;
the arcuate portion of the surface being serrated to define an arcuate row of saw teeth;
the lever having a lever edge which is also serrated with a row of saw teeth shaped to mesh with the saw teeth of the arcuate portion;
the lever being movable from a meshing position to a non-meshing position in which the lever is free to move around the pivot axis to move the lever and the teeth thereof along the arcuate row of saw teeth to adjust the position of the link.

16. An animal feeder comprising:
a hopper for containing a feed material to be dispensed to an animal for feeding therefrom;
a receptacle for receiving the feed from the hopper from which the animal can take the feed;
an opening through which the feed passes so that the amount of feed discharged from the hopper to the receptacle is controlled by a width of the opening;
and an adjustment linkage for operating adjustment movement of the opening, the linkage including:
a manually adjustable lever mounted for pivotal movement about a pivot axis;
a link attached to the lever and to an element of the opening such that pivotal movement of the lever causes longitudinal movement of the link to effect adjustment of the opening;
a plate mounted on an end wall of the hopper parallel thereto and spaced therefrom and defining a surface over which the lever moves, the plate defining an arcuate edge lying on an arc of a circle surrounding the pivot axis of the lever and facing outwardly of the axis;
the arcuate edge of the surface being serrated to define an arcuate row of saw teeth;
the lever being formed by a flat of sheet material which lies in a plane parallel to and slides over the plate;
the lever including a portion thereof which is bent out of a plane of the lever into the plane of the plate;
the portion of the lever having a lever edge facing radially inwardly toward the axis which is also serrated with a row of saw teeth shaped to mesh with the saw teeth of the arcuate portion;
the portion of the lever being movable in a direction axially of the axis away from the plate from a meshing position to a non-meshing position in which the lever is free to move around the pivot axis to move the lever and the teeth thereof along the arcuate row of saw teeth to adjust the position of the link.

17. The feeder according to claim 16 wherein the lever has a hole therein exposing a portion of the plate and markings thereon adjacent the row of saw teeth thereon.

18. The feeder according to claim 16 wherein the lever is pivotally mounted on the plate.

19. The feeder according to claim 16 wherein the link is connected to the lever by a pin which is slidable in a slot in the plate.

20. The feeder according to claim 19 wherein the pin carries a spring which biases the lever into engagement with the plate into said meshing position and which is compressible to allow movement of the lever to the non-meshing position.

* * * * *